Figure 1:
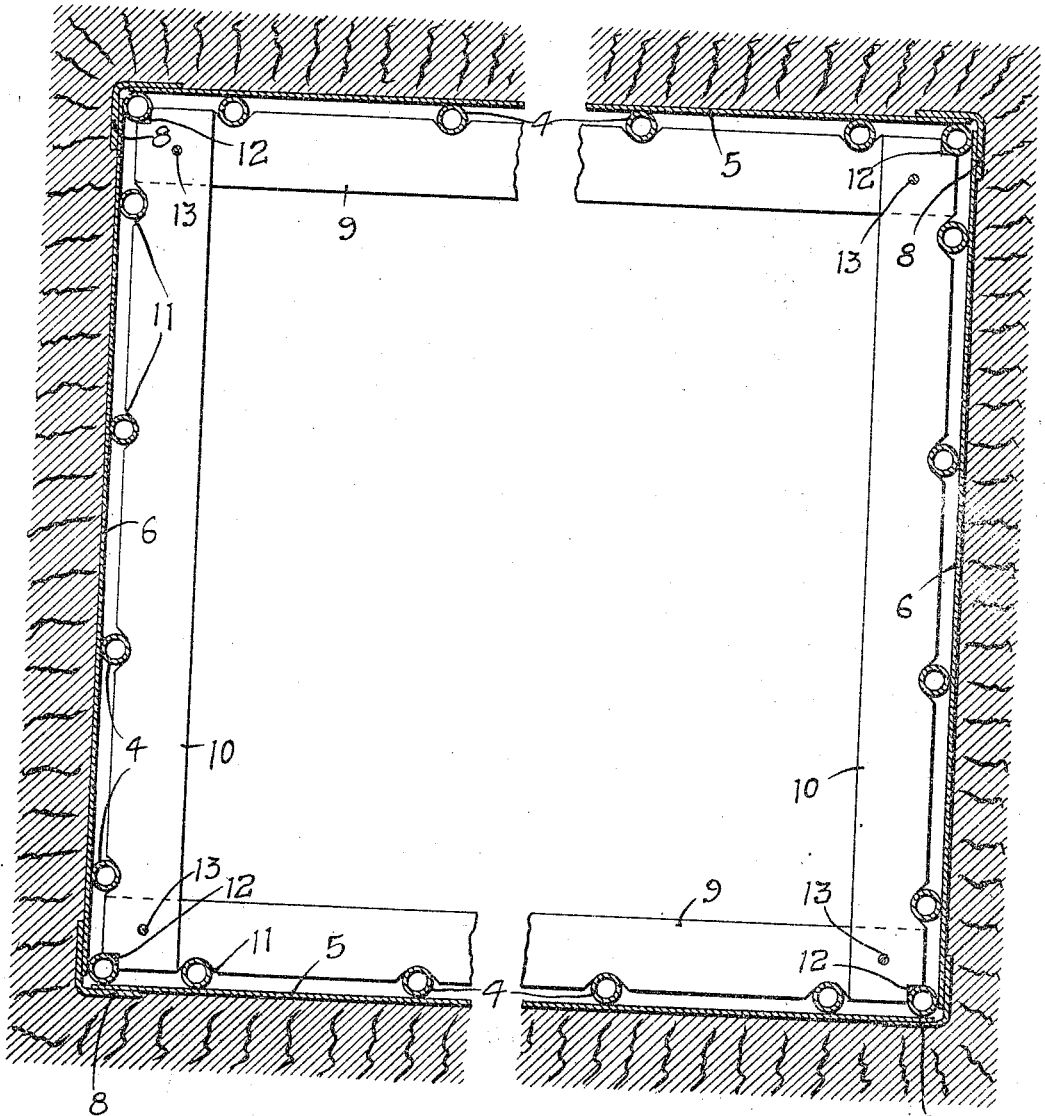

W. T. McCARTHY.
LINING FOR SHAFTS.
APPLICATION FILED JAN. 24, 1911.

1,008,727.

Patented Nov. 14, 1911.
4 SHEETS—SHEET 1.

WITNESSES

INVENTOR
WILLIAM T. McCARTHY
BY
ATTORNEYS

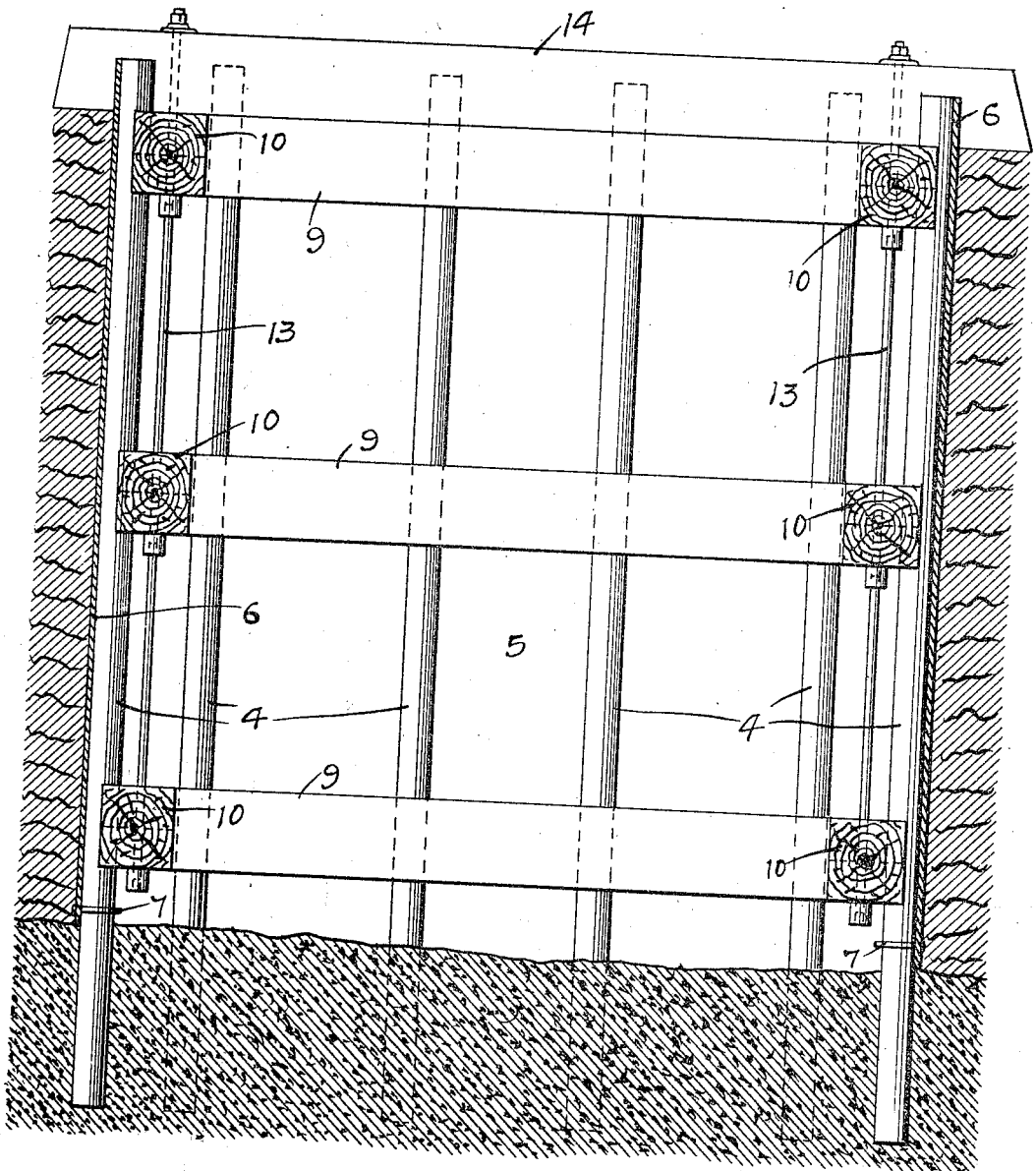

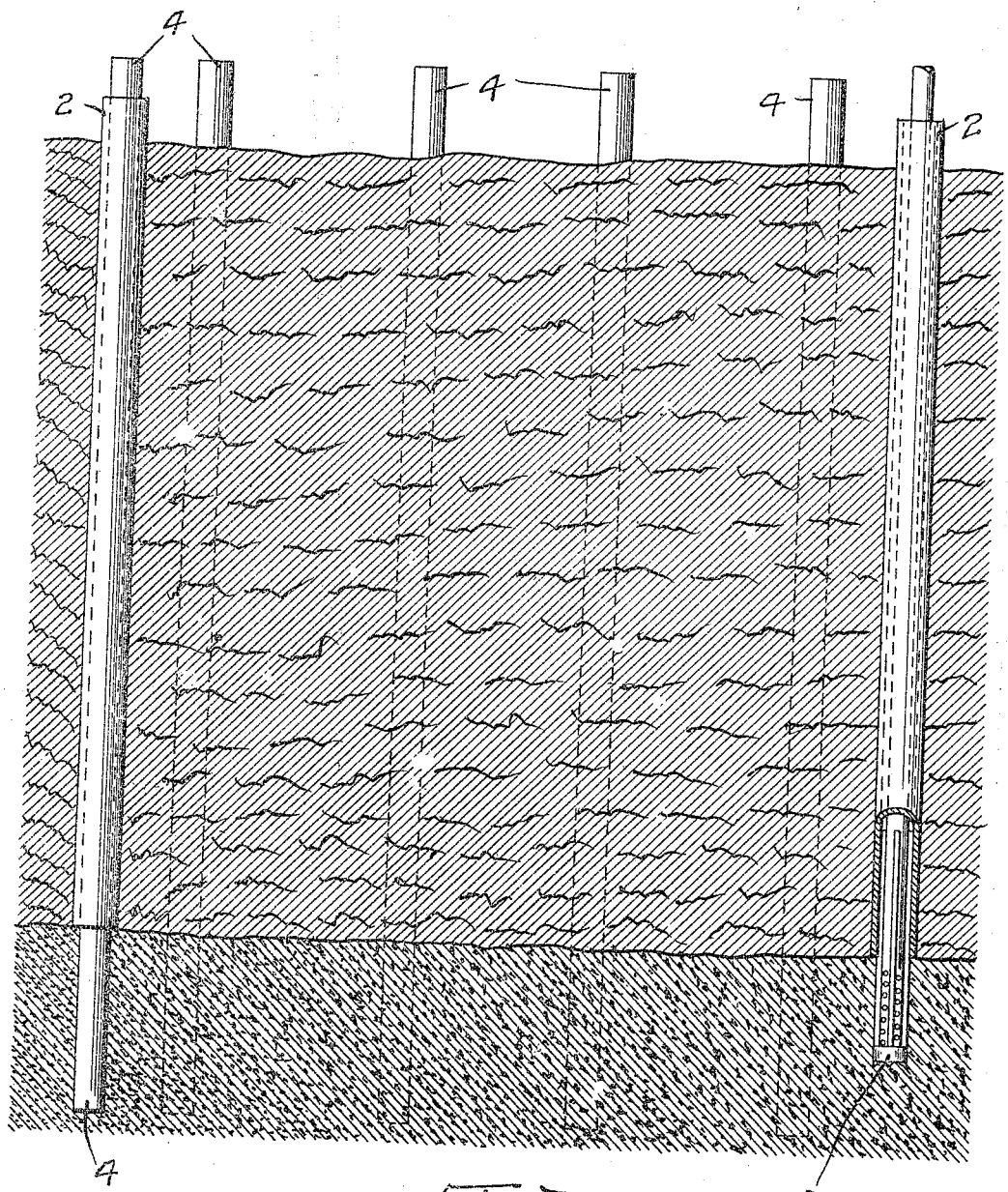

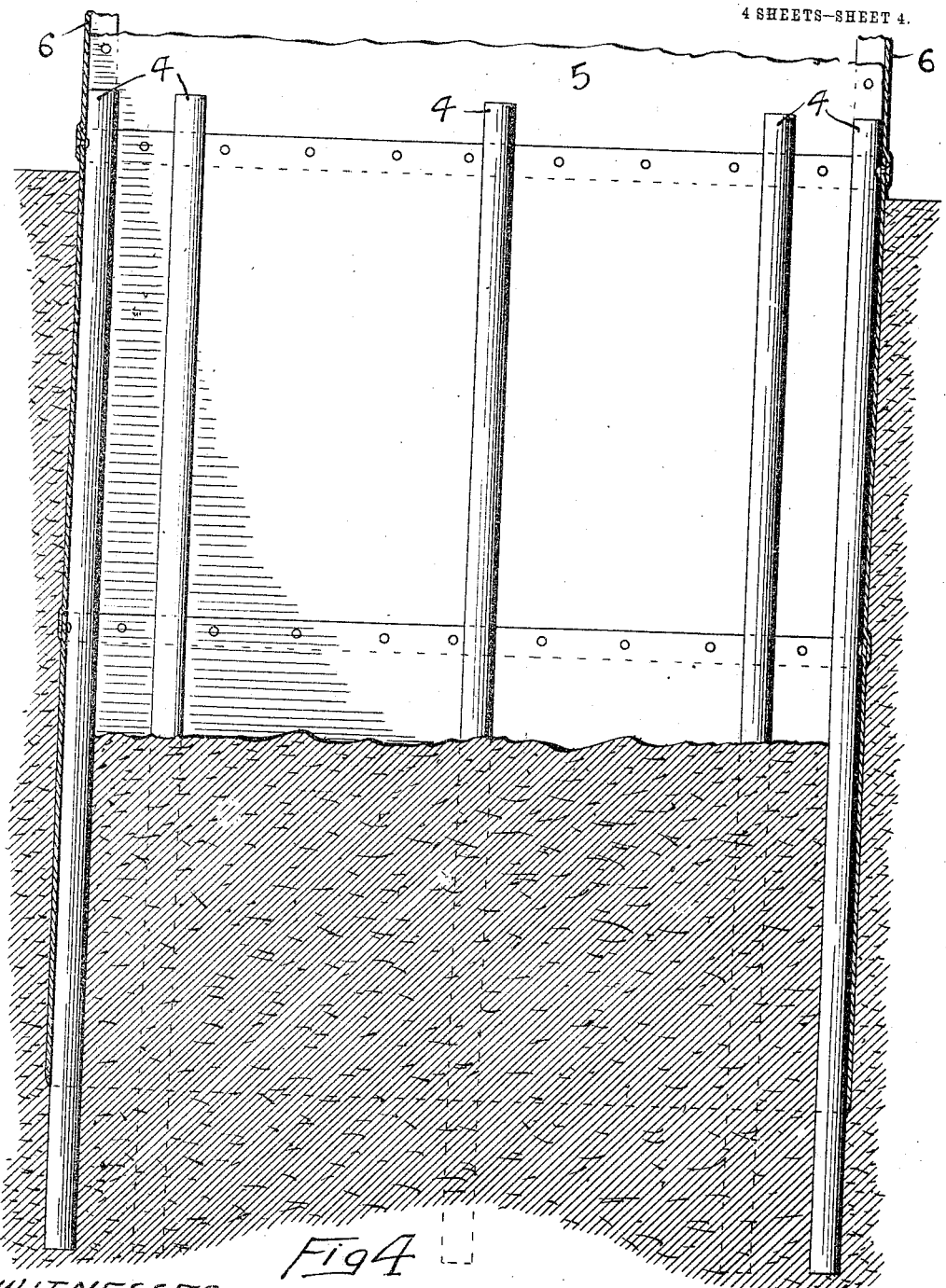

UNITED STATES PATENT OFFICE.

WILLIAM T. McCARTHY, OF CROSBY, MINNESOTA.

LINING FOR SHAFTS.

1,008,727.

Specification of Letters Patent. Patented Nov. 14, 1911.

Application filed January 24, 1911. Serial No. 604,498.

*To all whom it may concern:*

Be it known that I, WILLIAM T. MCCARTHY, of Crosby, Crow Wing county, Minnesota, have invented certain new and useful Improvements in Linings for Shafts, of which the following is a specification.

My invention relates to walls or linings for mining shafts or excavations of a similar nature and the object of the invention is to provide a lining which can be driven into the ground to the desired depth and then the material inclosed by the lining removed by any suitable means.

A further object is to provide a shaft lining which can be sunk into the ground with comparatively little effort and expense and which will securely hold the earth against caving in when the shaft has been completed.

Other objects of the invention will appear from the following detailed description.

The invention consists generally in uprights having their lower ends seated within sockets in the bed-rock, lining plates driven down outside the uprights and supported thereby, with means for bracing the uprights against inward collapse.

Further the invention consists in various constructions and combinations, all as hereinafter described and particularly pointed out in the claim.

In the accompanying drawings forming part of this specification, Figure 1 is a horizontal sectional view of a shaft and lining constructed in accordance with my invention, Fig. 2 is a vertical sectional view illustrating the manner of driving the pipes into the soil to sink them to the required depth, Fig. 3 is a similar view, illustrating the manner of forming the sockets in the bed-rock, into which the lower ends of the pipes are inserted. Fig. 4 is a detail view showing the manner of securing the lining plates together.

In the drawing, 2 represents a series of upright pipes of suitable diameter, preferably six inches, which are driven into the soil by means of a pile driver in the usual manner. The pipes are suitably spaced apart and as here shown are driven to form a rectangular shaped shaft, though it may be circular in form, if preferred. These pipes are driven to the desired depth, which will vary according to the character of the strata where the shaft is being sunk, and when the pipes contact with the bed-rock a drill 3 is inserted through the pipe and a socket drilled in the rock. The drill is then removed and a smaller pipe 4, say four inches in diameter, is lowered within the pipe 2 until it rests on the bottom of the socket drilled in the rock. The outer pipe may then be removed. In place of the pipe 4 a rod may be used, or any other suitable upright. When the pipes have all been put in place a suitable distance apart, the sheets 5 and 6 forming, respectively, the end and side walls of the shaft, are placed on edge on the ground against the pipes and driven edgewise into the soil, the plates being usually six or seven feet wide and of suitable length, according to the diameter of the shaft. When one plate has been sunk until its upper edge is nearly flush with the ground, a second plate is placed upon it and the two are riveted or bolted together and the driving operation is continued until the bottom of the shaft is reached, each plate being secured to the one above it and all of them being preferably composed of boiler plates which will be sufficiently strong and rigid to resist lateral pressure of the ground around the shaft. The plates will contact with the pipes on one side and be guided thereby as they are forced down into the ground and if necessary during the operation of sinking the plates, a stream of water may be directed below them to soften the soil or gravel so that the plates will sink easily through it. I may also provide loops 7 attached to the plates and passing around the pipes so that the plates will be held in contact with the pipes during the lining operation. At the corners of the rectangular shaft I prefer to provide angle plates 8 having flanges which lap by the abutting ends of the end and side plates and close the joints at the corners between the abutting plates. When the pipes and the lining have been put in place the earth inclosed is removed and as fast as it is removed I may timber the shaft, providing beams 9 and 10 pinned together at the corners and having notches 11 and 12 to receive the pipes. These beams are placed at suitable intervals in the excavation of the shaft and are preferably additionally supported by rods 13 which are suspended from cross timbers 14 at the top of the shaft.

I do not wish to confine myself to any particular depth of the shaft or the shape of the same in cross section, as it may be rectangular, circular or polygonal, as desired, and of any suitable cross sectional area, according to the purpose for which the excavation is to be used.

I claim as my invention:—

1. A shaft lining comprising a series of pipes vertically arranged and having their lower ends seated in sockets formed in the bed-rock, lining plates driven down between said pipes and the earth inclosing them and braced and supported on their inner side by said pipes, and means for holding said pipes against inward collapse when the shaft is excavated.

2. A shaft lining comprising a series of vertically arranged pipes having their lower ends fitting within sockets drilled in the bed-rock, lining plates having loops inclosing said pipes and guided thereby and driven down opposite said pipes and between them and the earth on the outer side of said pipes, and means for holding said pipes against inward collapse during the removal of the earth encircled by said pipes and plates.

3. A shaft lining comprising a series of uprights, vertically arranged and driven into the ground and encircling the shaft, lining plates placed edgewise, one upon another, and driven successively into the soil outside said uprights, said lining plates forming, when driven to the bottom of the shaft, an imperforate wall surrounding said uprights, and means for bracing said uprights and holding them in an upright position when the earth is removed to form the shaft.

4. A shaft lining comprising a series of upright pipes driven into the ground, plates arranged edgewise and also driven into the ground and forming the outer wall of the shaft and inclosing said pipes and supported by said pipes against the lateral pressure of the earth, timbers interposed between said pipes as the earth is excavated to form the shaft, and means supporting said timbers at intervals in the shaft.

5. A shaft comprising a series of pipes driven in an upright position into the ground, lining plates arranged edgewise, one upon another, and also driven into the ground on the outer side of said pipes, angle plates lapping by the abutting ends of said wall plates at the corners and supported with said wall plates by said pipes against inward pressure of the earth, and means for bracing said pipes against inward collapse when the earth inclosed by said wall plates is removed to form the shaft.

6. A shaft lining comprising a series of uprights having their lower ends driven into the ground, lining plates driven down between said uprights and the earth inclosing them and braced and supported by said uprights, and means for holding said uprights against inward collapse when the shaft is excavated.

7. A shaft lining comprising a series of uprights, vertically arranged, lining plates placed edgewise, one upon another, and driven successively into the soil outside said uprights, said lining plates forming, when driven to the bottom of the shaft, an imperforate wall surrounding said uprights.

8. A shaft lining comprising a series of uprights driven into the ground, lining plates arranged edgewise, one upon another, and also driven into the ground on the outer side of said uprights, and angle plates lapping by the abutting ends of said lining plates at the corners and supported thereby against inward pressure.

In witness whereof, I have hereunto set my hand this 20th day of January, 1911.

WILLIAM T. McCARTHY.

Witnesses:
GENEVIEVE E. SORENSEN,
EDWARD A. PAUL.